(12) United States Patent
Ehrhardt

(10) Patent No.: US 7,854,800 B2
(45) Date of Patent: Dec. 21, 2010

(54) ALKANOLAMINE-STABILIZED DISPERSED ROSIN SIZING AGENTS AND THEIR PREPARATION

(75) Inventor: Susan M. Ehrhardt, Haddonfield, NJ (US)

(73) Assignee: Hercules Incorporated, Wilmington, DE (US)

( * ) Notice: Subject to any disclaimer, the term of this patent is extended or adjusted under 35 U.S.C. 154(b) by 55 days.

(21) Appl. No.: 12/069,377

(22) Filed: Feb. 8, 2008

(65) Prior Publication Data

US 2008/0190578 A1      Aug. 14, 2008

Related U.S. Application Data

(63) Continuation-in-part of application No. 11/705,345, filed on Feb. 12, 2007, now abandoned.

(51) Int. Cl.
*C09D 193/04* (2006.01)
*C08L 93/04* (2006.01)
*D21H 17/62* (2006.01)

(52) U.S. Cl. .................... 106/238; 106/237; 162/180

(58) Field of Classification Search .............. 106/238, 106/237; 162/180
See application file for complete search history.

(56) References Cited

U.S. PATENT DOCUMENTS

| | | | |
|---|---|---|---|
| 2,628,918 A | 2/1953 | Wilson et al. | 106/238 |
| 2,684,300 A | 7/1954 | Wilson et al. | 92/3 |
| 3,565,755 A | 2/1971 | Davison | 162/218 |
| 4,983,257 A * | 1/1991 | Schultz et al. | 162/158 |
| 5,192,363 A | 3/1993 | Bussell et al. | 106/218 |
| 5,201,944 A | 4/1993 | Nakata et al. | 106/144 |
| 5,492,600 A | 2/1996 | Dragner et al. | 162/164.1 |
| 5,846,308 A | 12/1998 | Lauzon | 106/218 |
| 6,074,468 A | 6/2000 | Bates et al. | 106/145.1 |

FOREIGN PATENT DOCUMENTS

| | | |
|---|---|---|
| DE | 571299 | 2/1933 |
| DE | 1 131 348 | 8/1960 |
| DE | 197 35 636 | 2/1999 |
| EP | 0 652 323 | 5/1995 |
| GB | 1003972 | 8/1961 |
| WO | WO 97/45590 | 12/1997 |
| WO | WO00/23651 | 4/2000 |

OTHER PUBLICATIONS

High Volume Production Chemical Challenge Program, Test Plan for Rosin Adducts and Adduct Salts, Pine Chemicals Association, Inc., (Sep. 2001).*
*Kirk-Othmer Encyclopedia of Chemical Technology*, 3rd Edition, 1978 Alkanolamines, p. 947-948.
Strazdins, E. "The Sizing of Paper," W. F. Reynolds, ed. Tappi Press 1989, p. 1.

* cited by examiner

*Primary Examiner*—David M Brunsman
(74) *Attorney, Agent, or Firm*—Joanno Mary Fobare Rossi

(57) ABSTRACT

This invention teaches the stabilization a dispersion of rosin using an alkanolamine salt of the rosin. The stabilized dispersion is used as a sizing agent in papermaking processes.

12 Claims, No Drawings

ALKANOLAMINE-STABILIZED DISPERSED ROSIN SIZING AGENTS AND THEIR PREPARATION

The present application is a continuation-in-part application of U.S. application Ser. No. 11/705,345, filed Feb. 12, 2007 now abandoned the disclosure of which is expressly incorporated by reference herein in its entirety.

FIELD OF THE INVENTION

This invention relates to the emulsification and stabilization of dispersions of rosin by using alkanolamine salts of rosin. Such dispersions are useful in the manufacture of sized paper and paperboard.

BACKGROUND

Soluble rosin salts are surface active materials which generally makes them useful as emulsifiers. The sodium salts of rosin were used to stabilize the first dispersed rosin sizing agents that were developed (see, for example, Davison, U.S. Pat. No. 3,565,755). Unfortunately, the stability of these products was not great. They were shear sensitive and the particles settled over time; sediment that collected at the bottom of tanks was difficult to remove.

Not previously evaluated are the alkanolamine salts of rosin. Alkanolamine salts of fatty acids are known to be emulsifying agents. As, for example, in the *Kirk-Othmer Encyclopedia of Chemical Technology.* "Alkanolamines and long-chain fatty acids react at room temperature to give neutral alkanolamine soaps, which are waxy, noncrystalline materials with widespread commercial applications as emulsifiers." Analogous statements about the alkanolamine salts of rosin are not apparent in the literature. German Temporary Patent #1,131,348 (Jun. 14, 1962) makes mention of dispersions of "resin with a certain percentage of rosin soap" that contain "auxiliary emulsifiers, stabilzers, such as stearates, triethanolamine, casein, waxes, fillers, such as kaolin, and other additives," but the identities of the stabilizers are unclear from this reference. Alkanolamines are not among the "suitable alkaline materials" listed by Davison.

BRIEF SUMMARY OF THE INVENTION

It has now been demonstrated that it is possible to make dispersions of rosin or rosin adducts using an alkanolamine salt of rosin. These dispersions are physically stable on storage and have good pump (shear) stability. It is understood that as used hereinafter the term "rosin" shall include "rosin" per se and "rosin adducts" unless otherwise indicated.

It has been found that stable dispersions of rosin can be made by combining an organic phase of rosin with water that contains a defined amount of alkanolamine, and passing the mixture through a homogenizer. The alkanolamine is believed to react with rosin to form an alkanolamine salt of the rosin, which serves to stabilize the dispersion. The final product is a stable dispersion with low viscosity and uniform mean particle size, usually of 0.3 to 1.5 microns. These dispersions are physically stable on storage as shown by viscosity measurement and have good pump (shear) stability.

The composition aspect of this invention is a rosin sizing composition that is an aqueous emulsion of rosin stabilized with an alkanolamine rosin salt.

The process aspect of the invention is a process for preparing an oil-in-water emulsion, which comprises a) taking a mixture of
  i) an organic phase of a rosin, and
  ii) an aqueous phase of an alkanolamine,
  the amount of alkanolamine being sufficient to provide a stable dispersion when step b) is carried out.
b) homogenizing the resulting mixture from a) to obtain particles having a mean particle size between 0.3 and 1.5 micron.

It is believed that because the alkanolamine is reacting with the rosin to form a salt, there is a limit to the amount of alkanolamine that can be used in this process. If the level of salt is too high, the dispersion is not stable.

DETAILED DESCRIPTION OF THE INVENTION

Stable dispersions of rosin can be made by combining an organic phase of rosin with an aqueous phase that contains a defined amount of alkanolamine, and passing the mixture through a homogenizer.

The organic phase can simply be molten rosin, or it can be a solution of the rosin in an organic solvent such as methylene chloride. If the organic phase is molten rosin, homogenization must be carried out at elevated temperature and pressure. The product is then cooled to ambient temperature through a heat exchanger. If the organic phase is a solution of rosin in an organic solvent, the homogenization can be carried out at ambient temperature and pressure. The solvent must then be stripped from the emulsion, leaving a stable dispersion of the rosin.

The rosin component can be any of the commercially available types of rosin such as wood rosin, gum rosin, tall oil rosin, and mixtures thereof, in their crude or refined state. Partially or substantially completely hydrogenated rosins and polymerized rosins, as well as rosins that have been treated to inhibit crystallization, such as by heat treatment or reaction with formaldehyde, can be used as the rosin component as well as mixtures thereof.

The "rosin adduct" useful in this invention is the reaction product of rosin and an acidic compound containing the

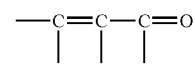

group and is derived by reacting rosin and the acidic compound at elevated temperatures of from about 150° C. to about 210° C. Methods of preparing these reaction products are described in U.S. Pat. Nos. 2,628,918 and 2,684,300. These reaction products are often referred to in the art as Diels-Alder reaction products, and are sometimes referred to as "rosin adducts," "adducts," or "fortified rosin."

Examples of acidic compounds containing the

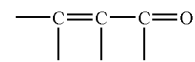

group that can be used to prepare the adducts used herein include the α,β-unsaturated polybasic organic acids and their known anhydrides, specific examples of which include fumaric acid, maleic acid, acrylic acid, maleic anhydride, itaconic acid, itaconic anhydride, citraconic acid and citraconic anhydride.

The amount of acidic compound employed will be that amount which will provide fortified rosin containing from about 1 to about 16% by weight of reacted acidic compound based on the weight of the fortified rosin. Best results are obtained at levels of about 3-8%

The aqueous phase is a solution of the alkanolamine in water. Because the alkanolamine is reacting with the rosin to form a salt, there is a limit to the amount of alkanolamine that can be used in this process. If the level of salt is too high, the dispersion is not stable. The alkanolamine can be for example triethanol amine, diethanolamine, diisopropanolamine, and the like. The preferred amount of alkanolamine is the amount sufficient to generate about 0.0033 to 0.011 moles alkanolamine salt (reaction product of alkanolamine and a resin acid) per 100 grams aqueous phase, or in the case of triethanolamine, 1.5-5 wt % of the triethanolamine salt based on aqueous phase.

The organic phase and the aqueous phase containing the alkanolamine are combined to form a coarse oil-in-water emulsion referred to as the premix. The premix is homogenized to form a stable oil-in-water emulsion. The alkanolamine salts of the rosin serve as the emulsifying agent for the emulsion. Any of the appropriate homogenization techniques can be used, from an ultra-sonic probe to a Gaulin homogenizer.

The final product is a stable dispersion of the rosin stabilized with the alkanolamine salt of rosin or rosin adduct. The particles comprising the dispersed phase are relatively small, with a mean particle size of about 0.3 to 1.5 micron. The product is of relatively low viscosity, <50 cps, with good physical stability. The product is shear stable, as indicated by a lab pump stability test.

Other additives, such as defoamers, biocides and other preservatives, can be added to the stable dispersion of the present invention in amounts and using techniques known to those in the industry.

The compositions of this invention can be applied as internal paper sizing agents or surface sizing agents. Internal sizing involves adding the sizing agent to the pulp slurry before sheet formation, while surface sizing involves immersion of the paper in the sizing agent or spraying the sizing agent on the paper, followed by drying at elevated temperatures in accordance with known drying techniques. The present invention is useful in sizing paper materials such as, for example, linerboard and food packaging board. The amount used is based on the sizing requirements of the paper mill, depending upon the required degree of sizing, the grade of paper, the type of pulp furnish used to make the paper, and other factors well known and easily determined empirically by those skilled in the art. In general, the least amount of sizing agent is used to obtain the desired sizing specifications.

The rosin sizing compositions can be used with papermaker's alum or other equivalent aluminum compounds (e.g. polyaluminum chloride, PAC). The aluminum compound is applied as a separate component to the pulp when a dispersion of the current invention is used as an internal size or when it is applied as an external, surface size. The amount of aluminum compound to be used is determined based on the type, the grade of paper being treated, the amount of sizing agent being applied, and other factors well known to those skilled in the art.

Papermaker's alum, or other equivalent aluminum compound, is required for the development of sizing with rosin sizing agents. The rosin reacts with the aluminum to form an insoluble aluminum salt, which is the active sizing agent. The aluminum also coordinates with the cellulose hydroxyls to anchor the sizing agent in place. (Strazdins, E. in *The Sizing of Paper*, W F Reynolds, ed., Tappi Press, 1989, pg. 1)

The Hercules Size Test (HST) is a standard test in the industry for measuring the degree of sizing (TAPPI Test Method T530 om-96). This method employs an aqueous dye solution as the penetrant to permit optical detection of the liquid front as it moves through the paper sheet. The apparatus determines the time required for the reflectance of the sheet surface not in contact with the penetrant to drop to a predetermined percentage of its original reflectance. All HST testing data reported measure the seconds to 80% reflection with 20% formic acid ink unless otherwise noted. The use of formic acid ink is a more severe test than neutral ink and tends to give faster test times. High HST values are better than low values. The amount of sizing desired depends upon the kind of paper being made and the system used to make it.

Particle Size Measurement

Particle size was determined using a Malvern Mastersizer Microplus using procedures recommended by the manufacturer.

Viscosity Measurement

Viscosity was determined at 25° C. by means of a Brookfield Viscometer, LV Series, using a No. 1 spindle at 60 rpm.

EXAMPLES

In the following examples, the sizing efficacy of the rosin dispersions was determined on a pilot paper machine using a pulp furnish that is a blend of recycled medium (70%) and European old corrugated container (30%) with a Canadian standard freeness of 376 cc. The water for dilutions was adjusted to contain 50 ppm hardness and 25 ppm alkalinity.

A pilot scale papermachine designed to simulate a commercial Fourdrinier was used, including stock preparation, refining and storage. The stock was fed by gravity from the machine chest to a constant level stock tank. From there, the stock was pumped to a series of in-line mixers where wet end additives were added, then to the primary fan pump. The stock was diluted with white water at the fan pump to about 0.2% solids. Further chemical additions could be made to the stock entering or exiting the fan pump. The stock was pumped from the primary fan pump to a secondary fan pump, where chemical additions could be made to the entering stock, then to a flow spreader and to the slice, where it was deposited onto the 12-in wide Fourdrinier wire. Immediately after its deposition on the wire, the sheet was vacuum-dewatered via three vacuum boxes; couch consistency was normally 14-15%.

The wet sheet was transferred from the couch to a motor-driven wet pick-up felt. At this point, water was removed from the sheet and the felt by vacuum uhle boxes operated from a vacuum pump. The sheet was further dewatered in a single-felted press and left the press section at 38-40% solids.

A 160 g/sq m (98 lb/3000 ft2 ream) sheet was formed and dried on seven dryer cans to 5% moisture (dryer can surface temperatures were 85 C) and passed through a single nip of a 5-nip, 6 roll calendar stack at 40 pli.

In a simulated recycled linerboard furnish, on the pilot papermachine, the sizing efficiency of a product of this invention was equal to commercial dispersions of rosin adduct.

Example 1

Preparing a Fumaric Acid Adduct of Chinese Gum Rosin (CGR)

Fumaric acid, 174.08 parts at 99% solids, was reacted, at elevated temperatures, with Chinese gum rosin, 2700 parts. The fumaric acid dissolved in the molten rosin and reacted therewith to provide a reaction product. The reaction product, after substantially all the fumaric acid had reacted with the gum rosin, was allowed to cool to room temperature (about 23 C). The product was a mixture comprised of unreacted rosin and rosin-fumaric acid reaction product or adduct. The reaction product contained 6% by weight fumaric acid, substantially all of which had been reacted.

Example 2

Preparing a Triethanolamine (TEA)-Stabilized Rosin Dispersion—Gaulin/Preferred Amount of TEA—Example of the Invention A solution was prepared by dissolving 750 parts of reaction product from Example 1 in 893.93 parts of methylene chloride. The solution was thoroughly mixed with an aqueous solution prepared by dissolving 11.22 parts (98%) triethanol amine in 930 parts water to provide a coarse oil-in-water emulsion. The coarse emulsion was passed through a commercial homogenizer at a pressure of 3000 psi. The product was an oil-in-water emulsion of good stability. Substantially all methylene chloride was removed from the oil-in-water emulsion by distillation at reduced pressure to provide an aqueous dispersion which was passed through a paint filter. The final aqueous suspension had a solids content of 42.6% and a viscosity of 8cps. The aqueous suspension was comprised of suspended particles having diameters from about 0.05 micron to about 1.5 microns, with a mean average of 0.33 micron.

Example 3

3—Preparing a TEA-Stabilized Rosin Dispersion—Lab Sonicator/Preferred Amount of TEA—Example of the Invention A solution was prepared by dissolving 123.32 parts of reaction product from Example 1 in 147 parts of methylene chloride. The solution was thoroughly mixed with an aqueous solution prepared by dissolving 2.68 parts (98%) triethanol amine in 233.86 parts water to provide a coarse oil-in-water emulsion. The coarse emulsion was homogenized using a lab sonicator. The product was an oil-in-water emulsion of excellent stability. Substantially all the methylene chloride was removed from the oil-in-water emulsion by distillation at reduced pressure to provide an aqueous dispersion which was passed through a paint filter. The final aqueous suspension had a solids content of 36.61, a mean particle size of 0.29 um, and a viscosity of 7 cps.

Example 4

Preparing a TEA-Stabilized Rosin Dispersion—Too Much TEA

Example 3 was repeated, except 4.56 parts triethanol amine were added to water in preparation of the aqueous phase. The oil-in-water emulsion was homogenized without incident, but failed during removal of the methylene chloride with substantially all of the rosin separating from the aqueous phase.

Example 5

Preparing a NaOH-Stabilized Rosin Dispersion—Not a Base of the Invention

Example 3 was repeated, except the aqueous phase was prepared by simply adjusting the pH of 230 parts water to 12.5 using 11.15 parts of a 4% aqueous solution of sodium hydroxide. The aqueous suspension contained 34.96% total solids had a mean particle size of 0.34 micron and a viscosity of 6 cps.

Example 6

Pump Test Comparison of Examples 3 and 5

Pump Stability Data:

The test used in the lab to predict pump stability measures the time for the back-pressure on a screen placed in a recirculation loop to build-up to a predetermined level. Longer times correspond to better pump stability.

A Masterflex peristaltic pump, Model 7564-10 with head 7016 was used at a pump speed of 5, on a 0-10 scale. The tubing was set up to pass through a constant temperature bath to maintain the temperature of the product being tested at a constant temperature. A 100 mesh screen was used in the recirculation loop. The products are filtered through a 325 mesh screen before testing.

The dispersions of Examples 3 and 5 were evaluated using this lab test. The test was run at 27+/−1 C. With the dispersion of Example 5, based on Davison's patent, the pump test reached the cut-off level after only 120 minutes, whereas the dispersion of this invention, Example 3, pumped for the full duration of the test, 360 minutes, without building sufficient back-pressure to stop the test.

Example 7

Preparing Product from a Fumaric Acid Adduct of Tall Oil Rosin (TOR)

Example 1 was repeated, except 205.28 parts fumaric acid was added and tall oil rosin was used in place of the Chinese gum rosin to give a reaction product containing 7% fumaric acid, substantially all of which had reacted. This reaction product is then used in the preparation of an aqueous suspension as outlined in Example 3. The final product had total solids of 35.55% and a mean particle size of 0.26 micron. It had a viscosity of 6 cps., and after 4 weeks of aging the viscosity was still 6 cps.

Example 8

Preparing Product from a 6% Maleic Anhydride Adduct of Chinese Gum Rosin

Example 1 was repeated, except 172.34 parts maleic anhydride were used in place of fumaric acid to form a reaction product containing 6% maleic anhydride, substantially all of which had reacted. This reaction product was then used in the preparation of an aqueous suspension as outlined in Example 3. The final product had total solids of 45.41% and a mean particle size of 0.34 micron. The viscosity was 10 cps as made and was still 10 cps after 4 weeks of aging.

Example 9

Sizing Evaluation vs. Commercial Product (e.g. Hi-pHase 35)

Sizing efficiency was measured using the pilot laboratory paper machine described above. The sizing agent was added, with alum at the inlet of the primary fan pump. Alum was added at a level of 0.75%. No other chemical additives were used. The headbox pH was adjusted to 7, trimming with caustic if needed.

|  | Addition (%) | HST (sec) |
|---|---|---|
| Example 3 | 0.073 | 4 |
|  | 0.1 | 13 |
|  | 0.2 | 89 |
| Example 5 | 0.073 | 5 |
|  | 0.1 | 14 |
|  | 0.2 | 86 |
| Hi-pHase 35 | 0.073 | 4 |
|  | 0.1 | 12 |
|  | 0.2 | 66 |

Hi-pHase® 35 is a dispersion of rosin commercially available from Hercules Incorporated. This shows Example 3 (of invention) sizes as well as prior art Example 5 and Hi-pHase®.

The invention claimed is:

1. A rosin sizing composition consisting essentially of an aqueous oil-in-water emulsion of rosin stabilized with an alkanolamine rosin salt.

2. The composition of claim 1 wherein the alkanolamine in the salt is triethanolamine.

3. The composition of claim 1 wherein the alkanolamine rosin salt is present in an amount of between 0.0033 to 0.011 moles per 100 grams of aqueous phase of the composition.

4. The composition of claim 1 wherein the rosin is composed of rosin and rosin adduct in which the adduct is the reaction product of rosin and an acidic compound containing the group

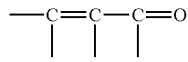

in which the adduct comprises 1% to about 16% by weight of the adducted rosin content.

5. Process for preparing an oil-in-water emulsion, which comprises
   a) forming a coarse oil-in-water emulsion consisting essential of
      i) an organic phase of a rosin, and
      ii) an aqueous phase of an alkanolamine,
      the amount of alkanolamine being sufficient to provide a stable dispersion when step b) is carried out, and
   b) homogenizing the resulting coarse oil-in-water emulsion to obtain an oil-in-water emulsion having a mean particle size between 0.3 and 1.5 microns.

6. Process of claim 5 in which the amount of alkanolamine present is sufficient to generate 0.0033 to 0.011 moles alkanolamine salt per 100 grams of aqueous phase.

7. Process of claim 5 wherein the rosin contains an adduct that is the reaction product of rosin and an acidic compound containing the group

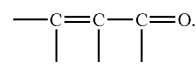

8. The process of claim 5 wherein the alkanolamine is triethanolamine.

9. The process of claim 5 in which the organic phase of rosin material is molten rosin.

10. Paper made by a process that includes adding the product of claim 1 to a slurry of cellulosic fibers.

11. Paper made by a process that includes surface coating a product of claim 1 onto paper.

12. Process for preparing an oil-in-water emulsion, which comprises
   a) forming a coarse oil-in-water emulsion consisting essential of
      i) an organic phase of a rosin, and
      ii) an aqueous phase of an alkanolamine,
      the amount of alkanolamine being sufficient to provide a stable dispersion when step b) is carried out, and
   b) homogenizing the resulting coarse oil-in-water emulsion to obtain an oil-in-water emulsion having a mean particle size between 0.3 and 1.5 microns
   wherein the emulsion is essentially stabilized by an alkanolamine rosin salt produced by the reaction of i) and ii).

* * * * *